(12) United States Patent
Valero et al.

(10) Patent No.: US 10,359,531 B2
(45) Date of Patent: Jul. 23, 2019

(54) NON-CONTACT SYSTEM AND METHODOLOGY FOR MEASURING A VELOCITY VECTOR

(71) Applicant: Schlumberger Technology Corporation, Sugar Land, TX (US)

(72) Inventors: Henri-Pierre Valero, Paris (FR); Jean-Christophe Auchere, Sagamihara (JP); Abderrhamane Ounadjela, Cambridge, MA (US); Hiroshi Nakajima, Sagamihara (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/617,127

(22) Filed: Jun. 8, 2017

(65) Prior Publication Data

US 2017/0357021 A1 Dec. 14, 2017

Related U.S. Application Data

(60) Provisional application No. 62/347,684, filed on Jun. 9, 2016.

(51) Int. Cl.
*G01V 1/50* (2006.01)
*E21B 47/18* (2012.01)
(Continued)

(52) U.S. Cl.
CPC ............ *G01V 1/50* (2013.01); *G01V 1/42* (2013.01); *G01V 1/20* (2013.01);
(Continued)

(58) Field of Classification Search
CPC ... G01V 1/42; G01V 1/50; G01V 1/20; G01V 2210/1234; G01V 2210/161;
(Continued)

(56) References Cited

U.S. PATENT DOCUMENTS 3,949,352 A * 4/1976 Vogel ............... G01V 1/053
367/31
4,240,915 A * 12/1980 Block ............... C09K 8/04
507/145
(Continued)

OTHER PUBLICATIONS

A. Kandasamy and K.P. Vishwanath, "Rheodynamic lubrication of a squeeze film bearing under sinusoidal squeeze motion", National Institute of Technology Karnataka, Computational & applied mathematics, vol. 26, N. 3, pp. 381-396, 2007.
A. Kandasamy and K.P. Vishwanath, "Inertia effects in circular squeeze film bearing using Herschel-Bulkley lubricants", National Institute of Technology Karnataka, Applied mathematical modeling, N. 34, pp. 219-227, 2010.
(Continued)

*Primary Examiner* — Daniel L Murphy
(74) *Attorney, Agent, or Firm* — Eileen Pape

(57) ABSTRACT

A technique facilitates monitoring of acoustic signals to measure a velocity vector of a borehole. Acoustic sensors are arranged in a desired acoustic sensor array and positioned along a body of a tool, e.g. a sonic logging tool. The acoustic sensor array is then positioned in fluid along a wall of a borehole formed in a subterranean formation. The acoustic sensors are used to collect acoustic signal data while the acoustic sensors are maintained in a non-contact position with respect to the wall of the borehole. The data may be processed to determine the desired velocity vector.

20 Claims, 6 Drawing Sheets

(51) Int. Cl.
*G01V 1/42* (2006.01)
*G01V 1/20* (2006.01)

(52) U.S. Cl.
CPC .............. *G01V 2210/121* (2013.01); *G01V 2210/1234* (2013.01); *G01V 2210/1299* (2013.01); *G01V 2210/1429* (2013.01); *G01V 2210/161* (2013.01); *G01V 2210/6222* (2013.01)

(58) Field of Classification Search
CPC ... G01V 2210/1429; G01V 2210/6222; G01V 2210/1299; G01V 2210/121
USPC .......................................................... 367/34
See application file for complete search history.

(56) References Cited

U.S. PATENT DOCUMENTS

| | | | | |
|---|---|---|---|---|
| 6,718,266 | B1* | 4/2004 | Sinha | G01V 1/48 367/75 |
| 6,748,330 | B2* | 6/2004 | Leaney | G01V 1/48 702/14 |
| 6,959,773 | B2* | 11/2005 | Mese | C09K 8/32 166/252.5 |
| 7,755,972 | B2* | 7/2010 | Yogeswaren | G01V 1/44 181/104 |

OTHER PUBLICATIONS

L.L. Ferras, J.M Nobrega, F.T. Pinho, "Analytical solutions for Newtonian and inelastic non-Newtonian flows with wall-slip", Journal of Non-Newtonian Fluid Mechanics, vol. 175-176, May 2012, pp. 76-88.
Micheal E. Baumert, Erez N. Allouche and Ian D. Moore, "Drilling fluid considerations in Design of Engineered Hirozontal Directional Drilling Installations", International Journal of Geomechanics, pp. 339-349, Dec. 2005.
Richard W. Hanks, "Motion Generated by an oscillating plate contacting a Bingham Body", Brigham Young University, Provo, Utah, AlChE Journal, vol. 20, No. 1, p. 173, Jan. 1974.
Krissa Elizabeth Ann (Jun. 2004). Design of a Non-Contact Vibration Measurement and Analysis System for electronic Board Testing. Thesis document, Massachusetts institute of technology. (137 pages).
Luis San Andrés (Dec. 2010). Modern Lubrication theory. Texas A&M University. Retrieved from http://rotorlab.tamu.edu/me626/Notes_pdf/Modern%20Lub%20Notes%2001-15.pdf (801 pages).
Tasos Papanastasiou, Georgios Georgiou, Andreas N. Alexandrou (Nov. 29, 1999), Viscous Fluid Flow. CRC Press. Chapter 6 "Unidirectional Flows" and Chapter 7 "Approximate Methods" (114 pages).
Larisa Muravleva (Jun. 27, 2013), Squeeze flow of a viscoplastic Bingham medium : an asymptotic solution (22 pages).

* cited by examiner

Grid of pressure sensors not parallel to the formation in the plane xy

Grid of pressure sensors, Measure of Ux

Grid of pressure sensors not parallel to the formation, in plane zy

Bingham model

NON-CONTACT SYSTEM AND METHODOLOGY FOR MEASURING A VELOCITY VECTOR

RELATED APPLICATIONS

The present document is based on and claims priority to U.S. Provisional Application Ser. No. 62/347,684, filed Jun. 9, 2016, entitled "Non-Contact System and Methodology for Measuring a Velocity Vector" to Henri-Pierre Valero, et al., which is incorporated herein by reference in its entirety.

BACKGROUND

The following descriptions and examples are not admitted to be prior art by virtue of their inclusion in this section.

Downhole acoustic investigation involves studying the structure of a subterranean formation based on acoustic waves measured at various locations in a borehole via sonic logging tools. The acoustic waves result from seismic activities involving natural or controlled events. Seismic techniques utilize an array of sensors arranged within a well, e.g. installed downhole in the well to benefit from low acoustic noise, and those techniques may comprise vertical seismic profiling, cross-well profiling, or single well profiling.

Conventional sonic logging tools are composed of transmitters and receivers. Transmitters generate acoustic waves that propagate through fluid and formation prior to the receivers (acoustic sensors) detecting such propagations. Some acoustic monitoring techniques utilize shuttles equipped with geophones or accelerometers coupled to the formation and decoupled from a body of the logging tool. However, the ability to couple sensors to the formation is limited by the size of the sensor packaging and the compliance of the formation. The technique also may have limits with respect to the frequency bandwidth of the acquired signal while relying on complex tool architecture to ensure the desired coupling. The signal is acquired while the logging tool is stationary and the sensors are anchored to the formation. As a result, movement of the logging tool to the next depth of measurement involves a complex process of releasing the anchoring, moving the logging tool, and re-anchoring the sensors in contact with the formation.

SUMMARY

In general, a system and methodology facilitate monitoring of acoustic signals to measure a velocity vector of a borehole. Acoustic sensors are arranged in a desired acoustic sensor array and positioned along a body of a tool, e.g. a sonic logging tool. The acoustic sensor array is then positioned in fluid along a wall of a borehole formed in a subterranean formation. The acoustic sensors are used to collect acoustic signal data while the acoustic sensors are maintained in a non-contact position with respect to the wall of the borehole. The data may be processed to determine the desired velocity vector related to the acoustic signals.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
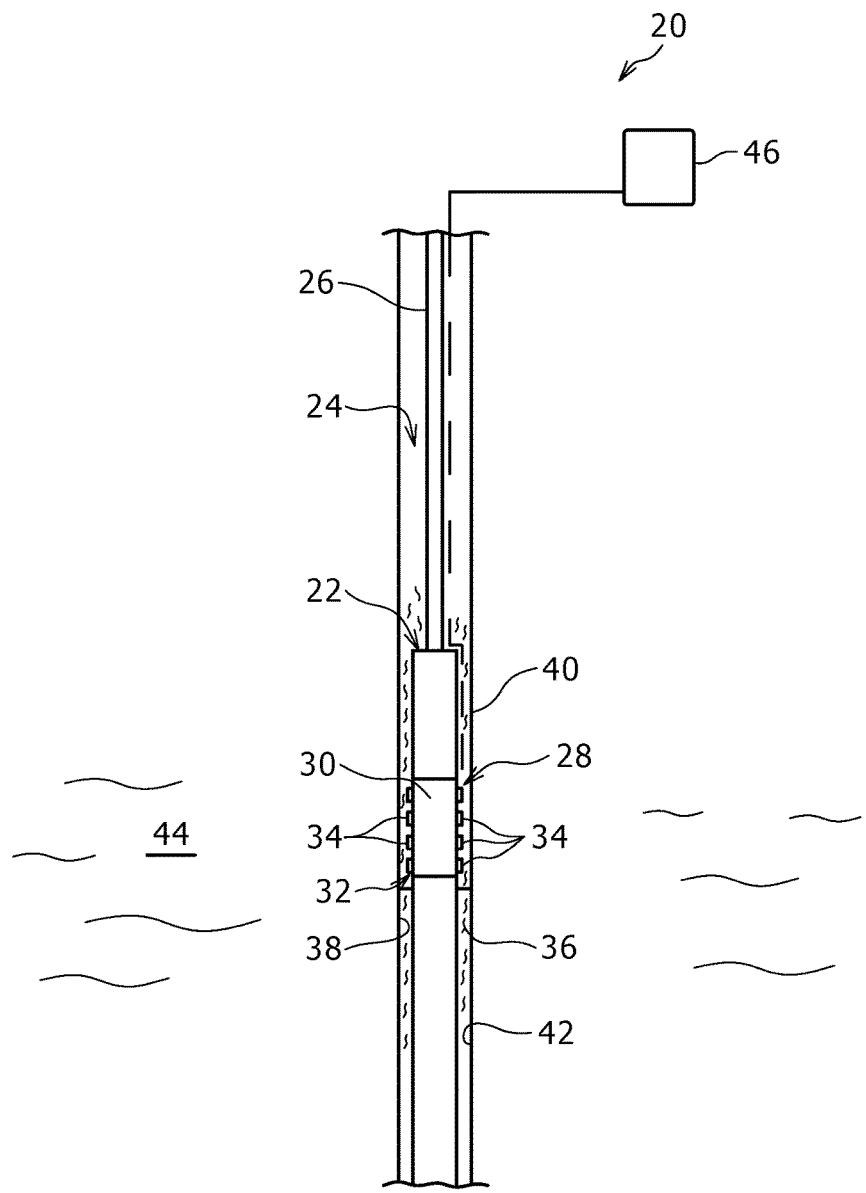
FIG. 1 is an illustration of an example of a sonic logging system deployed in a borehole and including a plurality of acoustic sensors for monitoring an acoustic signal while in a non-contact position with respect to a surrounding wall of the borehole, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for monitoring of acoustic signals to measure a velocity vector of a borehole resulting from the acoustic signals. According to an embodiment, acoustic sensors are arranged in a desired acoustic sensor array. The acoustic sensor array may be positioned along a body of a tool, e.g. a sonic logging tool, which is then conveyed to a subterranean measurement location. For example, the acoustic sensor array may be positioned in fluid along a wall of a borehole formed in a subterranean formation.

The acoustic sensors are used to collect acoustic signal data while the acoustic sensors are maintained in a non-contact position with respect to the wall of the borehole. By way of example, the acoustic sensors may be pressure sensors which monitor pressure variations in the fluid indicative of velocity vector related information corresponding with the acoustic signals. The data acquired by the sensors may be processed to determine the desired velocity vector.

According to embodiments described herein, a non-contact pressure sensor array is positioned to measure the velocity vector of a borehole. The sensor array is sensitive to the velocity components of the borehole but does not physically touch the formation. For example, the sensor array may comprise pressure sensors arranged to form a sensor pad used in determining and describing fluid dynamic behavior between the pad and the borehole wall. The data obtained due to the action of the acoustic signals may be used to derive the vector velocity of the wall from appropriate fluid mechanics equations.

The vibration of the wall resulting from acoustic signals induces a fluid motion which can be described using, for example, Navier-Stokes equations while taking into account both the internal and viscous effects of the fluid. The acoustic sensors may be in the form of pressure sensors arranged in a pressure grid(s) in which different sets of pressure sensors are oriented at different inclinations with respect to the borehole wall to determine the desired acoustic velocity components at the borehole. For example, the orthogonal velocity of the borehole may be determined without a specific inclination of a pressure grid. Thus, the orthogonal velocity component can be determined with pressure sensors arranged generally parallel with the borehole wall. However, the tangential velocity component and the axial velocity component of the borehole are obtained by arranging grids of the pressure sensors at desired inclinations with respect to the borehole wall.

The non-contact technique described herein may be used for many types of fluids, including drilling muds and other well fluids. The quality of results obtained from the acoustic sensor array is related to the accuracy of the model used for processing the data obtained by the acoustic sensors. Examples of suitable models for processing the data include processing models based on Newtonian fluid laws and non-Newtonian fluid laws which describe the fluid behavior between the acoustic sensors and the formation. Depending on the application, various parameters also may be input into the analytical model. Examples of such parameters include fluid viscosity, distance from the sensor to the formation, and/or geometrical parameters of the sensor.

The acoustic sensor array may be used in a variety of acoustic logging operations, including the acoustic logging of a subterranean formation surrounding a borehole. The acoustic sensors, e.g. pressure sensors, effectively act as transducers which measure borehole wall vibration in a range of borehole seismic or sonic frequencies. The vibrations resulting from the acoustic signals can then be used to determine a velocity vector of the acoustic signal at the borehole. Depending on the application, the borehole may be cased, open hole (uncased), or partially cased and partially open hole.

Referring generally to FIG. 1, an embodiment of a well system 20 is illustrated for use in sonic logging applications. In this example, the well system 20 comprises a well tool string 22 deployed downhole in a borehole 24, e.g. wellbore, via a conveyance 26. The well tool string 22 comprises a sonic logging tool 28 having a tool body 30 combined with an array 32 of acoustic sensors 34. For example, the sonic logging tool 28 may comprise acoustic sensors 34 mounted along an exterior of the tool body 30.

The sonic logging tool 28 and its acoustic sensor array 32 are deployed downhole and positioned in a fluid 36, e.g. a drilling mud or production well fluid. During a sonic logging operation, the acoustic sensors 34 are maintained in a non-contact position with respect to a surrounding borehole wall 38 which defines the borehole 24. Depending on the application, the borehole wall 38 may be formed by a casing 40 in a cased section of the borehole and/or by the formation itself in an open hole section 42 of the borehole 24.

The borehole 24 is drilled into a formation 44 which may contain a reservoir of production fluids, such as oil, natural gas, and/or other desired fluids. In at least some embodiments, the acoustic sensors 34 are in the form of pressure sensors which monitor pressure variations in the fluid 36. The pressure variations are caused by acoustic signals, i.e. acoustic waves, which propagate through the formation 44, through the borehole wall 38, and through the fluid 36 in the borehole 24. As with conventional logging techniques, an acoustic source or sources may be used to initiate the acoustic signal which is then received and monitored by the acoustic sensors 34.

The data acquired by the acoustic sensors 34 may be processed by a suitable processing system 46, such as a computer-based processing system. In some applications, data from the acoustic sensor array 32 may be transmitted uphole during the logging operation to a surface processing system 46. However, other applications may store the acoustic signal velocity related data for later processing. Additionally, the processing system 46 may be located at least partially downhole, at the surface, and/or at a remote location relative to the well site.

Figure 2:
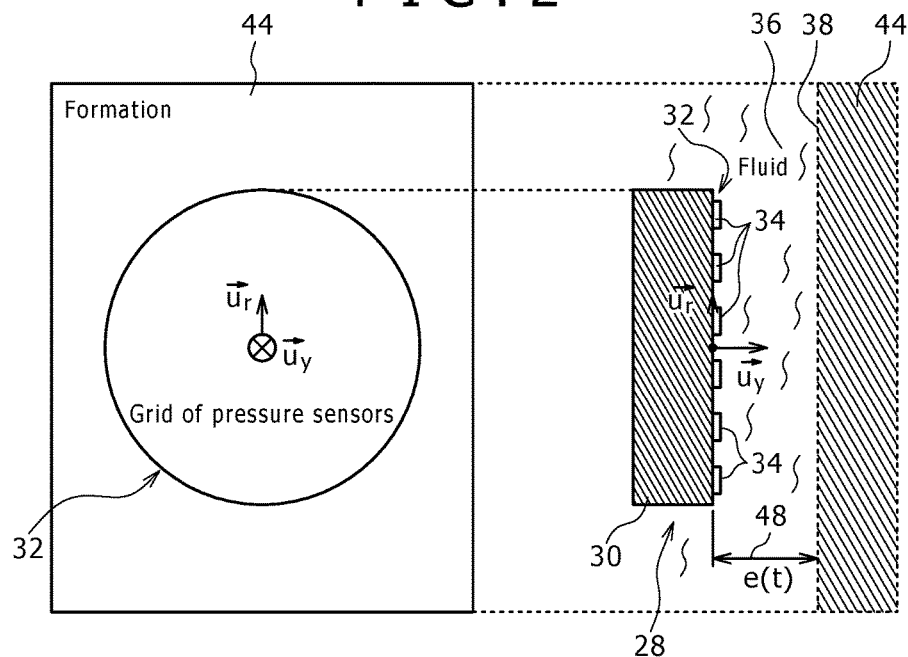
FIG. 2 is a schematic illustration of an example of a non-contact pressure sensor array arranged along the surrounding wall of the borehole to measure a velocity vector of the surrounding formation, according to an embodiment of the disclosure.

Referring generally to FIG. 2, a schematic representation is provided of at least a portion of an array of acoustic sensors 34. The acoustic sensors 34 are in the form of pressure sensors located in a desired grid, e.g. a circular grid, positioned along tool body 30. The pressure sensors 34 are positioned in fluid 36 at a predetermined distance 48 from borehole wall 38. The pressure sensors 34 are located in a non-contact position to measure the velocity vector of the borehole wall 38.

As described herein, the pressure sensors 34 may be arranged in various arrays 32 to measure the vector velocity field in the fluid filled borehole 24 while the pressure sensors 34 are held in a non-contact position with respect to the borehole wall 38. The sensors 34 may be specifically arranged to be sensitive to the three components of the velocity and may utilize a model based on the Navier-Stokes equations to access the vector velocity component of the borehole wall 38. This technique enables a faster seismic survey because complex clamping devices for holding sensors against the formation may be eliminated. Omission of the clamping devices also simplifies the architecture of the overall sonic logging tool.

Embodiments described herein also enable collection of data while the logging tool 28 is moving. In other words, acoustic measurement may be performed in logging mode while logging up or down along the borehole 24. By utilizing known fluid characteristics, the methodology described herein may be used to access the velocity vector in a variety of fluid types, including drilling mud and well fluids.

Consequently, the methodology may be used in a variety of oilfield applications and other applications. For example, the methodology may be used to obtain better quality measurements of the borehole velocity field during wireline logging or logging while drilling operations. Additionally, the methodology may be applied in conjunction with a variety of seismic acquisition frequencies, including frequencies in hertz, kilohertz, or megahertz ranges.

In specific applications, the acoustic sensors 34 are in the form of pressure sensors located downhole in fluid 36 at a predetermined distance from the borehole wall 38. The fluid 36 may comprise a variety of fluid types, including mud used to facilitate drilling of borehole 24 and/or mud used to consolidate the well. The acoustic sensor array 32 is constructed to obtain data on the velocity vector:

$$\langle U_x, \dot{e}_t, U_z \rangle$$

via an equation or equations related to flow induced by motion of the borehole wall 38.

For example, by using the equation of mass conservation, the velocity vector component:

$$\dot{e}_t$$

Figure 3:
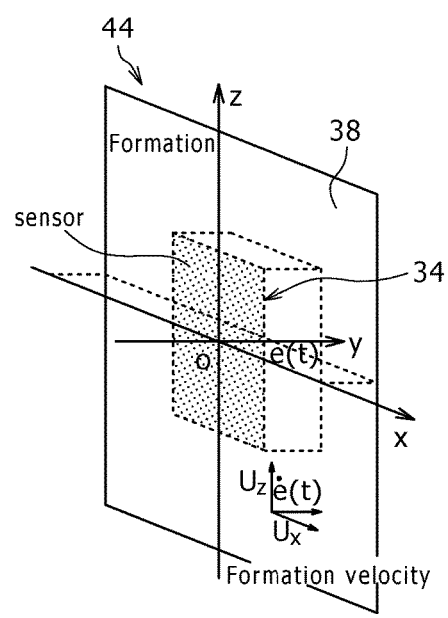
FIG. 3 is a schematic illustration of an example of a model of an acoustic sensor used to measure a velocity vector of a formation, according to an embodiment of the disclosure.

(which is orthogonal to borehole wall 38) can be determined. FIG. 3 illustrates schematically a model of one of the acoustic sensors 34 which is able to measure the velocity vector of the formation. The velocity vector can be derived based on knowledge/data of the fluid velocity near the sensor 34 in combination with a few additional parameters, such as the distance of the sensor 34 to the formation 44 and the dimension of the sensor 34.

If the fluid 36 is assumed incompressible, then the equation of conservation of mass for such a fluid is:

$$\frac{1}{r}\frac{\partial}{\partial r}(rv_r) + \frac{\partial v_y}{\partial y} = 0$$

It follows:

$$\int_0^{e(t)} \frac{1}{r}\frac{\partial}{\partial r}(rv_r)dy + \int_0^{e(t)} \frac{\partial v_y}{\partial y}dy = 0$$

$$\frac{1}{r}\frac{\partial}{\partial r}\left(r\int_0^{e(t)} v_r dy\right) + (v_y(e(t)) - v_y(y=0)) = 0$$

$$\frac{1}{r}\frac{\partial}{\partial r}\left(r\int_0^{e(t)} v_r dy\right) + \dot{e}(t) = 0$$

$$\frac{\partial}{\partial r}\left(r\int_0^{e(t)} v_r(y,r,t)dy\right) = -r\dot{e}(t)$$

$$r\int_0^{e(t)} v_r(y,r,t)dy = -\frac{r^2}{2}\dot{e}(t) + C(t)$$

The latter equation is valid for r=0 which gives C(t)=0 for t. The variation of e with time can be neglected giving:

$$\int_0^e v_r(y,r,t)dy = -\frac{r}{2}\dot{e}(t).$$

This can be rewritten as:

$$\dot{e}(t) = -\frac{2}{r}\int_0^e v_r(y,r,t)dy$$

The velocity of the formation is derived from the velocity of the fluid 36, which can be determined by, for example, a direct measurement or by the Navier-Stockes equation linking pressure to velocity.

As referenced above, embodiments described herein provide a methodology for accessing the velocity vector of the borehole wall 38 which results from the acoustic signals. In some embodiments, the methodology involves installing a set of pressure sensors 34 on a pad which holds the pressure sensors 34 at a desired distance from the formation 44. Various models may be employed to describe the fluid behavior coupling the formation 44 and the pressure sensor array 32. For example, the data obtained from sensors 34 may be processed using the processing system 46 according to the specific model selected.

One example of a suitable model enables access to the three velocity vector components of the formation 44 and uses the arrangement of pressure sensors 34 and the discretization of the Navier-Stokes equation to derive the velocity vector of the borehole wall 38. As described in more detail below, another model also has been developed which provides access to the velocity vector è(t). In particular, this latter model integrates the non-Newtonian behavior of the fluid in contact with the formation 44. This same model type may be used to resolve the Navier-Stokes equation for the velocity vector $\langle U_x, U_z \rangle$.

The first example of a suitable model neglects inertial effects of the fluid 36 and considers the viscous forces in the fluid as dominant. These assumptions are valid for a small stand-off of the grid of pressure sensors 34 when the fluid 36 can be considered a Newtonian fluid. With these assumptions, the behavior of fluid 36 can be described with Reynolds equation:

$$\Delta p_g = \frac{12\mu}{e_0^3}\frac{de}{dt} \text{ with } p_g = p + \rho g(z - z_{surf}).$$

Figure 4:
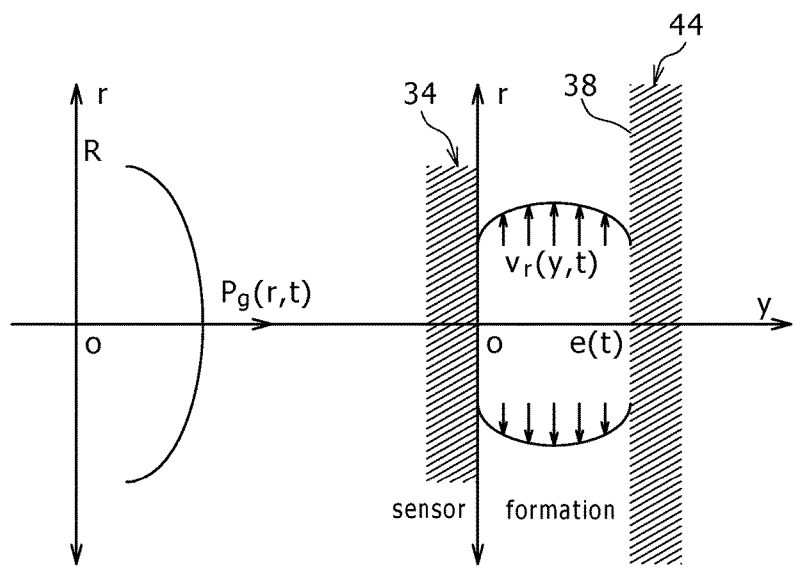
FIG. 4 is a schematic illustration of an example of a pressure distribution and velocity profile for a circular acoustic sensor, according to an embodiment of the disclosure.

Referring generally to FIG. 4, a schematic illustration is provided of a pressure sensor 34 having a circular configuration. For a circular sensor, the solution for the pressure and the velocity in the fluid 36 is described by the following equations, respectively:

$$P_g(r,t) = \frac{3\mu}{e_0^3}\frac{de}{dt}(t)r^2 + P_g(r=0)$$

$$v_r(y,t) = \frac{3r}{e_0^3}\frac{de}{dt}(t)y(y-e(t)).$$

FIG. 4 illustrates a pressure distribution and velocity profile for a circular sensor 34 loaded with compression.

Figure 5:
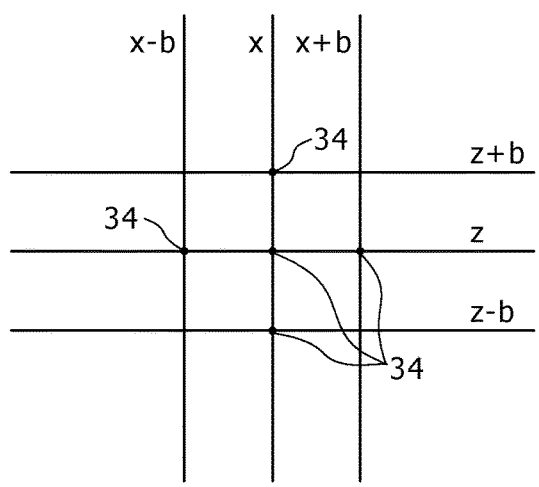
FIG. 5 is a schematic illustration of an example of an acoustic sensor grid, e.g. a pressure sensor grid, forming part of an array, according to an embodiment of the disclosure.

Under the same assumptions a more general method is to use a Taylor series expansion to discretize the Laplacian, and $\Delta p_g(x,z)$ may be provided by the grid of pressure sensors 34 illustrated in FIG. 5 according to the combination:

$$\Delta p_g(x,z) = \frac{p_g(x-b,z) + p_g(x+b,z) + p_g(x,z-b) + p_g(x,z+b) - 4p_g(x,z)}{b^2}$$

Then the Reynolds equation set forth above results in they axis velocity of the wall:

$$U_y = \frac{de}{dt} = \Delta p_g(x,z)\frac{e_0^3}{12\mu}$$

In some applications, this model may be improved by adding the inertial effect and a fluid behavior closer to reality by considering the fluid 36 in the borehole 24 as non-Newtonian. However, the principle of the measurement remains the same.

Figure 6:
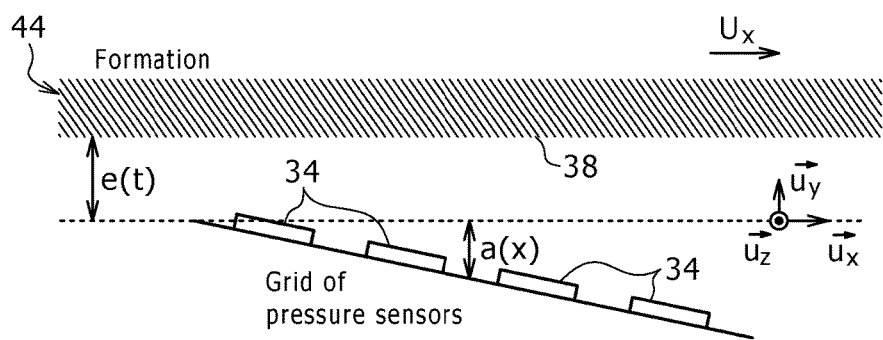
FIG. 6 is a schematic illustration of an example of a portion of an acoustic sensor array having a grid of pressure sensors positioned along an inclined plane not parallel to the formation in the xy plane, according to an embodiment of the disclosure.

An estimation of the velocity vector components in other directions may be achieved by providing the array 32 of acoustic sensors 34 with grids of the sensors 34 arranged at different inclinations, e.g. inclinations which are at a non-zero angle with respect to the formation 44, e.g. with respect to borehole wall 38. In other words, a portion of the acoustic sensors 34 of the array 32 may be arranged in a grid generally along a plane which is not parallel to the formation 44. With reference to FIG. 6, the inclination of the grid of sensors 34 in the xy plane provides access to the velocity component $U_x$ via the equation:

$$\frac{(e_0+a)^3}{12\mu}\Delta p_g + \frac{(e_0+a)^2}{4\mu}\frac{\partial a}{\partial x}\frac{\partial p_g}{\partial x} = \frac{1}{2}\frac{\partial a}{\partial x}U_x + \frac{de}{dt}$$

Figure 7:
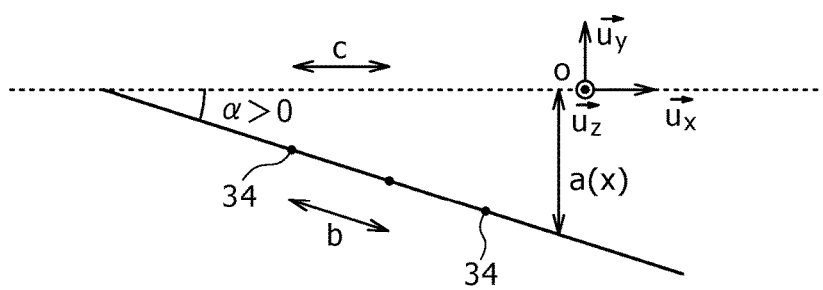
FIG. 7 is a graphical representation of the grid of pressure sensors, illustrated in FIG. 6, oriented at a non-parallel angle of inclination, according to an embodiment of the disclosure.

Because the grid of pressure sensors 34 is inclined, a good approximation for $\Delta p_g(x,z)$ is:

$$\Delta p_g(x,z) = \frac{p_g(x-c,z)+p_g(x+c,z)}{c^2} + \frac{p_g(x,z-b)+p_g(x,z+b)}{b^2} - 2\left(\frac{1}{c^2}+\frac{1}{b^2}\right)p_g(x,z)$$

where b is the distance between two close sensors 34, as represented in FIG. 7, and c may be obtained from the following equation:

$$c = b\cos\alpha = \frac{b}{\sqrt{1+\tan^2\alpha}} \text{ and } \tan\alpha = \left|\frac{\partial a}{\partial x}\right|.$$

FIG. 7 illustrates a grid of the pressure sensors 34 arranged to measure the velocity component $U_x$.

Figure 8:
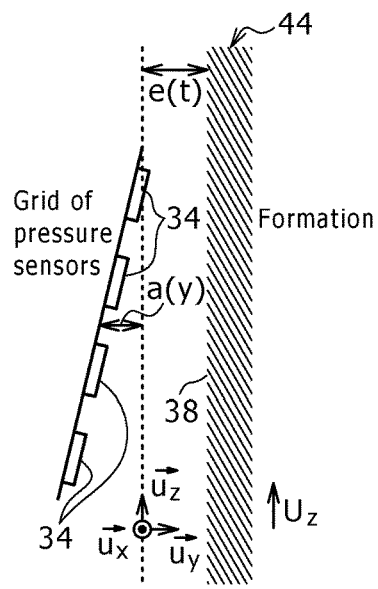
FIG. 8 is a schematic illustration of an example of a portion of an acoustic sensor array having a grid of pressure sensors positioned along an inclined plane not parallel to the formation in the zy plane, according to an embodiment of the disclosure.

Another velocity component may be measured via a second set or grid of pressure sensors 34 inclined in the yz plane, as illustrated in FIG. 8. The arrangement of sensors 34 illustrated in FIG. 8 may be used to obtain data which provides the velocity component $U_z$ via the equation:

$$\frac{(e_0+a)^3}{12\mu}\Delta p_g + \frac{(e_0+a)^2}{4\mu}\frac{\partial a}{\partial z}\frac{\partial p_g}{\partial z} = \frac{1}{2}\frac{\partial a}{\partial z}U_z + \frac{de}{dt}$$

The Laplacian $\Delta p_g(x,z)$ may be expressed following the same method/equation provided in the previous paragraph, knowing that the inclination depends on z.

The vector velocity $U_y$ may be derived by solving the Navier-Stokes equations including both the inertial and the viscous effects. Because the fluid 36 inside a given borehole 24 may be more complex than a Newtonian fluid, other models, e.g. the Bingham model, may be used to describe the viscosity law of the non-Newtonian medium. This latter model may be more accurate than the first model described above, at least in some applications; however the principles associated with the non-contacting sensors 34 are still applicable.

Figure 9:
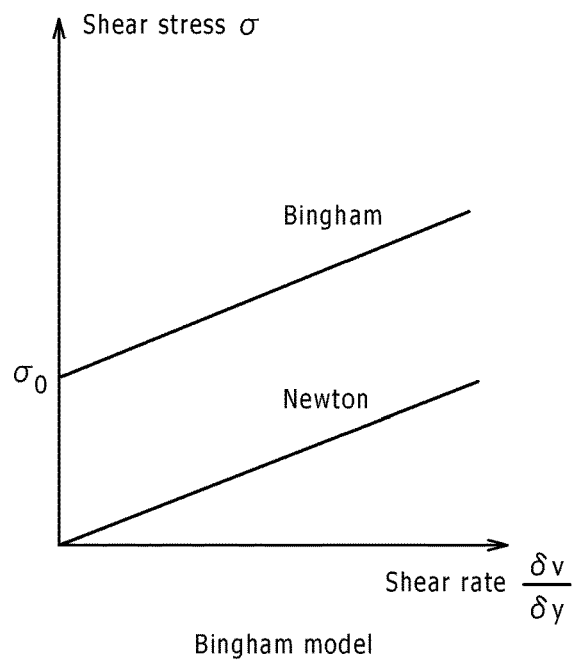
FIG. 9 is a graphical representation of monitoring results with respect to acoustic signals based on a Newton model and a Bingham model, according to an embodiment of the disclosure.

Two categories of non-Newtonian fluid are visco-plastic fluid and visco-elastic fluid. The visco-plastic fluids tend to be more likely found in borehole 24. Consequently, the Bingham model may be chosen to describe the viscosity law of the fluid 36. This model leads to a linear partial differential and is suitable for use in modeling drilling fluids and other fluids found in the petroleum industry. The Bingham model may be particularly accurate for use with fluids having high shear rates, as illustrated by the graphical comparison with Newtonian fluids illustrated in FIG. 9. The one-dimensional laws for this type of fluid may be provided by the following equation:

$$\begin{cases} \sigma = \sigma_0 \text{sgn}\left(\frac{\partial v}{\partial y}\right) + \mu\frac{\partial v}{\partial y} & \text{if } v \neq 0 \\ |\sigma| \leq \sigma_0 & \text{otherwise} \end{cases} \quad \text{(Bingham model)}$$

Navier-Stokes equations also may be used for a non-Newtonian fluid. Under the assumptions of an incompressible fluid and an isothermal flow, the Navier-Stokes equation may be set forth as follows:

$$\rho\frac{\partial \vec{v}}{\partial t} + \rho\vec{v}\cdot\overrightarrow{\text{grad}\vec{v}} = -\overrightarrow{\text{grad}p} + \overrightarrow{\text{div}\vec{\sigma}} + \rho\vec{g}$$

In the rest of the calculation, the gravity may be neglected, and the coordinate system depends on the geometry of the acoustic sensor 34.

By way of example, a circular geometry leads to simpler equations and the computation may be done for an axisymmetric geometry. For an axisymmetric flow, the projection of the Navier-Stokes equation on the r axis and y axis may be given by the following equations:

$$\begin{cases} \rho\left(\frac{\partial v_r}{\partial t} + v_r\frac{\partial v_r}{\partial r} + v_y\frac{\partial v_r}{\partial y}\right) = -\frac{\partial p}{\partial r} + \overrightarrow{\text{div}\vec{\sigma}}\cdot\vec{e_r} & (E_r) \\ \rho\left(\frac{\partial v_y}{\partial t} + v_r\frac{\partial v_y}{\partial r} + v_y\frac{\partial v_y}{\partial y}\right) = -\frac{\partial p}{\partial y} + \overrightarrow{\text{div}\vec{\sigma}}\cdot\vec{e_y} & (E_y) \end{cases}$$

According to one approach, the steady state flow of a Bingham fluid may be considered. The expression of the stress tensor may be provided by the equation:

$$\vec{\sigma} = 2\mu\vec{D} + \sigma_0\frac{\vec{D}}{\sqrt{2}\,\|\vec{D}\|}$$

where the deformation tensor is:

$$\vec{D} = \begin{pmatrix} \frac{\partial v_r}{\partial r} & 0 & \frac{1}{2}\left(\frac{\partial v_r}{\partial y} + \frac{\partial v_y}{\partial r}\right) \\ 0 & \frac{v_r}{r} & 0 \\ \frac{1}{2}\left(\frac{\partial v_r}{\partial y} + \frac{\partial v_y}{\partial r}\right) & 0 & \frac{\partial v_y}{\partial y} \end{pmatrix}$$

and the Euclidean norm is:
$\|.\|$.

The main term in this matrix is $$\frac{\partial v_r}{\partial y}$$

so that:

$$\vec{D} \approx \frac{1}{2}\begin{pmatrix} 0 & 0 & \frac{\partial v_r}{\partial y} \\ 0 & 0 & 0 \\ \frac{\partial v_r}{\partial y} & 0 & 0 \end{pmatrix}$$

Additionally:

$$\sigma = \mu \frac{\partial v_r}{\partial y} + \sigma_0 \mathrm{sgn}\left(\frac{\partial v_r}{\partial y}\right)$$

such that if:

$$\frac{\partial v_r}{\partial y} \neq 0, \vec{\sigma} \approx \begin{pmatrix} 0 & 0 & \sigma \\ 0 & 0 & 0 \\ \sigma & 0 & 0 \end{pmatrix}^2.$$

For a tensor of the form:

$$\vec{A} = \begin{pmatrix} 0 & 0 & A_{y,r} \\ 0 & 0 & 0 \\ A_{r,y} & 0 & 0 \end{pmatrix}, \overrightarrow{divA} = \begin{pmatrix} \frac{\partial A_{r,y}}{\partial y} \\ 0 \\ \frac{\partial A_{y,r}}{\partial r} \end{pmatrix}$$

Thus, the Navier-Stokes equation ($E_r$) is reduced to:

$$\rho\left(\frac{\partial v_r}{\partial t} + v_r \frac{\partial v_r}{\partial r} + v_y \frac{\partial v_r}{\partial y}\right) = -\frac{\partial p}{\partial r}(r, t) + \frac{\partial \sigma}{\partial y}(y, r, t)$$

The convective term can be neglected compared with the stress term if:

$$\frac{3}{4}\frac{\rho R a^2 \omega^2}{e^2} \ll \frac{\sigma_0}{e_0}$$

that is to say if $$\frac{\sigma_0 \rho R a^2 \omega^2}{e_0} \ll 1$$

The equations of Navier-Stokes ($E_r$) become:

$$\rho \frac{\partial v_r}{\partial t} = -\frac{\partial p}{\partial r} + \frac{\partial \sigma}{\partial y}$$

Because $e \ll R$, the equation ($E_y$) reduces to:

$$\frac{\partial p}{\partial y} = 0$$

This provides the following equation:

$$\rho \frac{\partial v_r}{\partial t}(y, r, t) = -\frac{\partial p}{\partial r}(r, t) + \frac{\partial \sigma}{\partial y}(y, r, t).$$

At low frequency the inertial term also may be neglected. However, this restriction may be overcome by using, for example, either a semi-analytical model or an analytical solution based on a Fourier series expansion.

As an example, the solution for a Newtonian fluid between two infinite parallel plates is provided by the equation:

$$v(y, t) = \\ -\frac{4}{\pi}\frac{1}{\rho}\sum_{n=0}^{+\infty} \frac{1}{2n+1} \sin\left((2n+1)\pi \frac{y}{e}\right) \int_0^t \frac{\partial p}{\partial r}(\tau)\exp\left(-(2n+1)^2 \pi^2 \frac{\nu(t-\tau)}{e_0^2}\right) d\tau$$

Similarly, at low frequency the Navier-Stokes equation can be reduced to:

$$\begin{cases} \sigma(y, r, t) = \mu \frac{\partial v_r}{\partial y}(y, r, t) + \sigma_0 \frac{v_r(y, r, t)}{|v_r(y, r, t)|} & \text{if } \frac{\partial v_r}{\partial y}(y, r, t) \neq 0 \\ |\sigma(y, r, t)| \leq \sigma_0 & \text{otherwise} \\ \frac{\partial \sigma}{\partial y}(y, r, t) = -f(r, t) \end{cases}$$

with: $f(r, t) = -\frac{\partial p}{\partial r}(r, t)$

This system of equations allows calculating the fluid velocity as follows:

$$\sigma(y, r, t) = -f(r, t)\left(y - \frac{e}{2}\right)$$

If $\frac{\sigma_0}{|f(r, t)|} > \frac{e}{2}$ then $\forall y \in [0, e], u_r(y, r, t) = 0$ Otherwise, $$u_r(y, r, t) = \begin{cases} -\frac{f(r, t)}{2\mu}y(y-e) - \mathrm{sgn}(f)(r, t)\frac{\sigma_0}{\mu}y & \text{if } y \in \left[0, \frac{e}{2} - \frac{\sigma_0}{|f(r, t)|}\right] \\ -\frac{f(r, t)}{2\mu}y(y-e) + \mathrm{sgn}(f)(r, t)\frac{\sigma_0}{\mu}y & \text{if } y \in \left[\frac{e}{2} + \frac{\sigma_0}{|f(r, t)|}, e\right] \\ C^{te} & \text{otherwise} \end{cases}$$

The formation velocity ė(t) can be deduced from the equation of conservation of mass. Initially, x(r,t) is set to:

$$x(r,t) = \frac{\sigma_0}{e_0 f(r,t)}$$

In a first scenario:

$$\forall r \in [0,R], |x(r,t)| > \tfrac{1}{2}$$

Then:

$$\dot{e}(t) = 0$$

In a second scenario:

$$\forall r \in [0,R], |x(r,t)| < \tfrac{1}{2}$$

Then:

$$\dot{e}(t) = -\frac{2}{3}\frac{\sigma_0 e_0^2}{\mu r}\frac{1}{x(r,t)}(1-|x(r,t)|)\left(\frac{1}{2} - |x(r,t)|\right)^2$$

It should be noticed the previous equation is identical to the Reynolds equation with $\sigma_0 = 0$. The computation of the velocity ė(t) of the borehole wall 38 may be performed on, for example, processing system 46 and may be accomplished by injecting in this equation the stand-off $e_0$, the viscosity of the fluid $\mu$, and the function f(r,t). The function f(r,t) is the pressure gradient provided by the pressure sensor array 32.

Figure 10:
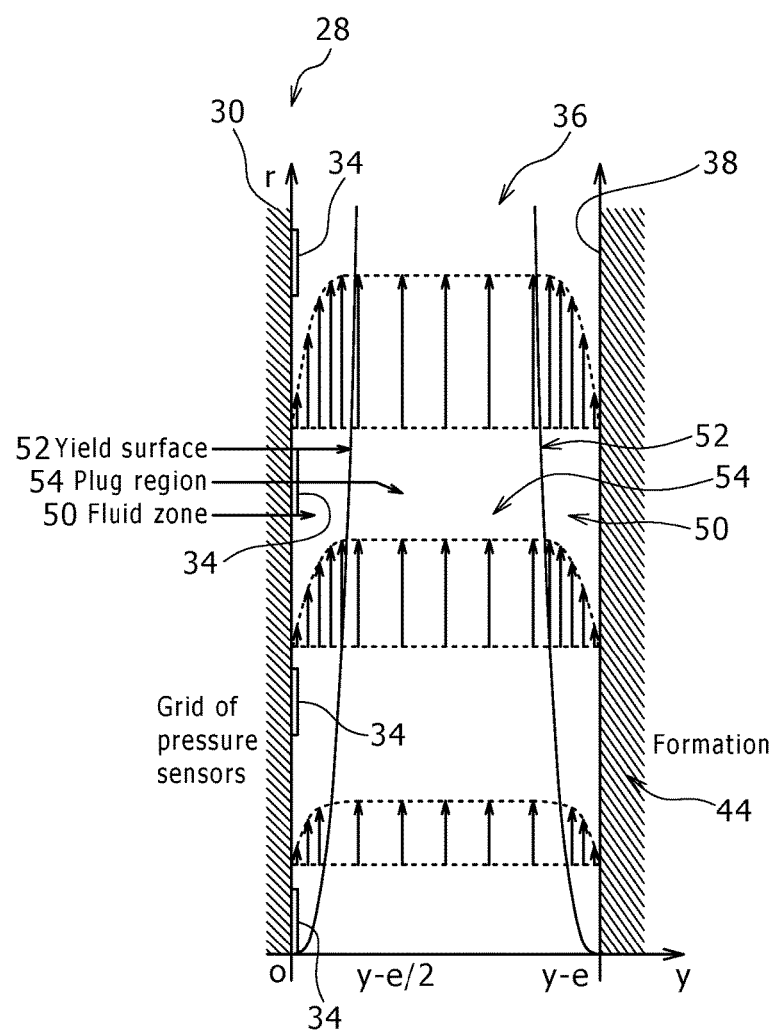
FIG. 10 is a graphical illustration showing zones of fluid flow between a borehole wall and a grid of acoustic sensors, e.g. pressure sensors, according to an embodiment of the disclosure.

Referring generally to FIG. 10, an illustration is provided which reflects computation of the flow between the acoustic sensors 34 and the borehole wall 38. The illustration shows the various zones of fluid flow along a grid of the acoustic sensors 34, e.g. pressure sensors, and includes a fluid zone 50 proximate sensors 34 as well as a yield surface 52, and a plug region 54. Similar zones of fluid flow exist along borehole wall 38. The profile of the flow of fluid 36 generally has three zones delimited by the yield surfaces 52. Within the fluid zones 50, the velocity profile demonstrates behavior of a Newtonian fluid. Within the plug region(s) 54, the fluid 36 moves at generally the same velocity. As $\sigma_0$ tends to decrease, the plug region 54 becomes thinner. However, when the plug region 54 becomes larger, $\sigma_0$ tends toward infinity.

Accordingly, the array 32 of pressure sensors 34 may be positioned downhole at a desired distance from the borehole wall 38 and those sensors 34 may be used to collect pressure data which is processed by processing system 46 to determine a vector velocity of the borehole wall 38. As described herein, grids of the pressure sensors 34 may be arranged at different inclinations relative to the borehole wall 38 such that the overall sensor array 32 may be used to determine the three components of the velocity vector.

By way of example, the orthogonal component of the velocity vector may be measured with a grid of pressure sensors 34 arranged parallel with the formation 44. The other components of the velocity vector may be measured via grids of the pressure sensors 34 arranged at other inclinations. For example, a tangential velocity component may be measured with a grid of the sensors 34 inclined in the cross-sectional plane of the borehole 24. The axial velocity component may be measured with a grid of pressure sensors 34 inclined following the yz plane.

As demonstrated above, the vector velocity of the borehole wall 38 may be derived from the Navier-Stokes equation which describes the flow of fluid 36 coupling the sensors 34 to the formation 44. The accuracy of the measurement of the vector velocity field may depend on the selection of the model or methodology employed for processing the data collected by sensors 34. Examples of suitable models have been described and include a model utilizing a Newtonian fluid and also a model which takes into account non-Newtonian effects of some fluids, e.g. various fluids used in oilfield operations. Depending on the application, the models may be refined by taking an analytical approach or by combining a numerical and analytical method of resolution. Depending on the model implemented, fluid viscosity, sensor distance from the formation, sensor geometrical parameters, and/or other parameters may be input into the selected model.

Depending on the parameters of a given application and/or environment, the structure of sonic logging tool 28 may comprise a variety of additional and/or other components. For example, various arrangements of transmitters and receivers/sensors 34 may be located along tool body 30. The tool body 30 also may have a variety of configurations and comprise supplemental components. The non-contact acoustic sensors 34 may be operated while the logging tool 28 is at a stationary position in borehole 24 or while the logging tool 28 is moved along the borehole 24, thus providing increased flexibility with respect to performing logging operations. The acoustic sensors 34 may be employed in a variety of boreholes, e.g. wellbores, and may be used with many types of acoustic sources. Similarly, various types of processing systems 46, e.g. computer-based processing systems, may be used to process the data collected by sensors 34 at downhole and/or surface locations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for performing acoustic logging, the method comprising:
   conveying a logging tool including an array of acoustic sensors downhole into a borehole formed in a subterranean formation;
   locating the array of acoustic sensors at a non-contacting position with respect to a wall of the borehole;
   measuring, via the array of acoustic sensors, vibration of the wall, the acoustic sensors to generate sensor data based on the measuring; and
   determining a velocity vector of the vibration of the wall based on the sensor data.

2. The method as recited in claim 1, further including determining one or more of an orthogonal velocity component of the velocity vector, a tangential velocity component of the velocity vector, and an axial velocity component of the velocity vector based on the sensor data.

3. The method as recited in claim 1, further including orienting the acoustic sensors of the array on different planes of inclination relative to the wall of the borehole.

4. The method as recited in claim 1, further comprising determining the velocity vector based on a Newtonian fluid analytical model.

5. The method as recited in claim 1, further comprising determining the velocity vector based on a non-Newtonian analytical model.

6. The method as recited in claim 1, wherein the array of acoustic sensors comprises pressure sensors.

7. The method as recited in claim 1, wherein the acoustic sensors are to generate the sensor data while submerged in a well fluid.

8. The method as recited in claim 1, wherein the acoustic sensors are to generate the sensor data while submerged in a drilling mud.

9. The method as recited in claim 1, wherein the acoustic sensors are to generate the sensor data while the logging tool is moved along the borehole.

10. A method, comprising
positioning an array of acoustic sensors in a fluid and along a wall within a subterranean formation, the acoustic sensors arranged on a plane, the plane to be disposed at an angle of inclination with respect to the wall;
measuring, via the acoustic sensors, vibration of the wall while the acoustic sensors are maintained in a non-contact position with respect to the wall, the acoustic sensors to generate sensor data based on the measuring; and
determining a velocity vector of the vibration of the wall based on the sensor data.

11. The method as recited in claim 10, wherein the array is associated with a logging tool.

12. The method as recited in claim 11, further comprising conveying the logging tool downhole into a wellbore formed in the subterranean formation.

13. The method as recited in claim 12, wherein the measuring is to be performed in a cased section of the wellbore.

14. The method as recited in claim 12, wherein the measuring is to be performed in an open hole section of the wellbore.

15. The method as recited in claim 10, wherein the acoustic sensors are to generate the sensor data while submerged in a drilling mud.

16. The method as recited in claim 10, wherein the acoustic sensors are to generate the sensor data while submerged in a well fluid.

17. The method as recited in claim 10, wherein the acoustic sensors comprise pressure sensors.

18. A system, comprising:
a sonic tool having an array of acoustic sensors arranged along a plane, the plane to be disposed at an angle of inclination relative to a wall of a borehole, the acoustic sensors to measure pressure variations in a fluid associated with vibration of the wall without contacting the wall; and
a processor to determine a velocity vector of the vibration based on the sensor data.

19. The system as recited in claim 18, wherein the sonic tool is a logging tool deployed in the borehole.

20. The system as recited in claim 19, wherein the angle of inclination of the plane is to enable determining of at least one of an orthogonal velocity component of the velocity vector, a tangential velocity component of the velocity vector, and an axial velocity component of the velocity vector.

* * * * *